(12) United States Patent
Schweitzer et al.

(10) Patent No.: US 10,427,463 B2
(45) Date of Patent: Oct. 1, 2019

(54) PNEUMATIC TIRE HAVING A DUAL LAYER TREAD

(71) Applicant: The Goodyear Tire & Rubber Company, Akron, OH (US)

(72) Inventors: Claude Schweitzer, Colmar-Berg (LU); Jean-Louis Marie Félicien Thomas, Waltzing (BE); Bodo Ahrens, Trier (DE); Giorgio Agostini, Colmar-Berg (LU); Laurent Carmelo Joseph Andre Pravata, Beaufays (BE); Gabor Kaszas, Akron, OH (US); Karen Karas Burke, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 208 days.

(21) Appl. No.: 15/353,048

(22) Filed: Nov. 16, 2016

(65) Prior Publication Data
US 2018/0134086 A1    May 17, 2018

(51) Int. Cl.
*B60C 11/00* (2006.01)
*B60C 1/00* (2006.01)
(Continued)

(52) U.S. Cl.
CPC ........ *B60C 11/0041* (2013.01); *B60C 1/0016* (2013.01); *B60C 11/0058* (2013.01);
(Continued)

(58) Field of Classification Search
CPC . B60C 1/00; B60C 1/0016; B60C 2001/0083; B60C 11/0041; B60C 11/005; B60C 11/075; B60C 11/0058
(Continued)

(56) References Cited

U.S. PATENT DOCUMENTS 4,092,455 A    5/1978    Pinto
4,436,853 A    3/1984    Schloman
(Continued)

FOREIGN PATENT DOCUMENTS

DE    19812934 A1    9/1999
EP    1708896 B1    3/2008
(Continued)

OTHER PUBLICATIONS

EPO search report completed Apr. 4, 2018 and received by Apr. 23, 2018.

*Primary Examiner* — Eric Hug
(74) *Attorney, Agent, or Firm* — John D. DeLong (57) ABSTRACT

The invention relates to a pneumatic tire comprising a carcass and a tread located radially outward of the carcass and extending between the tire sidewalls; the tread providing a radially outermost tread running surface; the tread comprising a first tread layer comprising a first rubber compound and a second tread layer comprising a second rubber compound; wherein the second tread layer is located radially adjacent to the first tread layer; wherein the first rubber compound is compositionally distinct from the second rubber compound; wherein the second tread layer comprises one or more integrally formed extensions of the second tread layer extending radially outwardly toward the tread running surface; wherein each of the integrally formed extensions of the second tread layer comprises a circumferentially continuous groove and a reinforcement zone disposed on a side of the groove; wherein the first rubber compound comprises 100 parts by weight of at least one diene based elastomer, and from 1 to 150 phr of silica; and the second rubber compound comprises a diene base elastomer, from 50 to 120 phr of a filler, wherein at least 20 phr of the filler is a high surface area carbon black having an iodine adsorption number of at least 100 g/kg, from 1 to 45 phr of a methylene (Continued)

acceptor, from 1 to 25 phr of a methylene donor, and from 1 to 30 phr of at least one additive selected from the group consisting of carbamic resins, liquid diene based polymers having a number average molecular weight ranging from 1000 to 25000, and aromatic hydrocarbon resins.

19 Claims, 6 Drawing Sheets

(51) Int. Cl.
    *C08K 3/36* (2006.01)
    *C08L 7/00* (2006.01)
    *C08L 9/06* (2006.01)
    *B60C 11/03* (2006.01)
    *B60C 11/01* (2006.01)

(52) U.S. Cl.
    CPC ............ *B60C 11/0075* (2013.01); *C08K 3/36* (2013.01); *C08L 7/00* (2013.01); *C08L 9/06* (2013.01); *B60C 2011/016* (2013.01); *B60C 2011/0341* (2013.01); *C08L 2205/035* (2013.01); *Y02T 10/862* (2013.01)

(58) Field of Classification Search
    USPC .............................................. 152/209.5, 905
    See application file for complete search history.

(56) References Cited

U.S. PATENT DOCUMENTS

| | | | |
|---|---|---|---|
| 4,478,266 A | 10/1984 | Pierson et al. |
| 4,605,696 A | 8/1986 | Benko |
| 4,889,481 A | 12/1989 | Morris |
| 5,030,692 A | 7/1991 | Durairaj |
| 5,194,513 A | 3/1993 | Wideman |
| 5,206,289 A | 4/1993 | Sinsky |
| 5,244,725 A | 9/1993 | Dressler |
| 5,395,891 A | 3/1995 | Obrecht |
| 5,405,897 A | 4/1995 | Segatta |
| 5,504,127 A | 4/1996 | Wideman |
| 5,504,140 A | 4/1996 | Zanzig et al. |
| 5,665,799 A | 9/1997 | Inui |
| 5,688,871 A | 11/1997 | Inui |
| 5,859,169 A | 1/1999 | Burkhart et al. |
| 5,936,056 A | 8/1999 | Durairaj |
| 5,937,926 A | 8/1999 | Powell |
| 5,942,069 A | 8/1999 | Gerresheim et al. |
| 5,945,500 A | 8/1999 | Durairaj |
| 6,127,488 A | 10/2000 | Obrecht |
| 6,133,364 A | 10/2000 | Obrecht |
| 6,207,757 B1 | 3/2001 | Obrecht |
| 6,213,181 B1 | 4/2001 | Janajreh |
| 6,242,523 B1 | 6/2001 | Blok et al. |
| 6,242,534 B1 | 6/2001 | Obrecht |
| 6,336,486 B1 | 1/2002 | Iwasaki et al. |
| 6,372,857 B1 | 4/2002 | Obrecht |
| 6,458,884 B1 | 10/2002 | Colvin |
| 6,472,457 B1 | 10/2002 | Durairaj |
| 6,541,551 B1 | 4/2003 | Durairaj |
| 6,591,879 B1 | 7/2003 | Beckmann et al. |
| 6,605,670 B1 | 8/2003 | Durairaj |
| 6,608,125 B2 | 8/2003 | Cruse |
| 6,959,743 B2 | 11/2005 | Sandstrom |
| 7,249,621 B2 | 7/2007 | Sandstrom |
| 7,253,225 B2 | 8/2007 | Labauze et al. |
| 7,671,128 B2 | 3/2010 | Thielen et al. |
| 8,104,523 B2 | 1/2012 | Losi |
| 8,413,697 B2 | 4/2013 | De Monte et al. |
| 8,686,086 B2 | 4/2014 | Abad et al. |
| 8,695,662 B2 | 4/2014 | Braun et al. |
| 8,759,471 B2 | 6/2014 | Schafer et al. |
| 8,919,404 B2 | 12/2014 | Schweitzer |
| 9,050,859 B2 | 6/2015 | Reinardt et al. |
| 9,050,860 B2 | 6/2015 | Djelloul-Mazoiaz et al. |
| 9,650,492 B2 | 5/2017 | Makiuchi et al. |
| 2003/0130535 A1 | 7/2003 | Deschler |
| 2003/0166743 A1 | 9/2003 | Huynh-Tran et al. |
| 2004/0103974 A1 | 6/2004 | Majumdar et al. |
| 2006/0157177 A1 | 7/2006 | Shimada et al. |
| 2007/0017617 A1 | 1/2007 | Lafrique et al. |
| 2007/0037908 A1 | 2/2007 | Pille-Wolf |
| 2007/0221303 A1 | 9/2007 | Sandstrom et al. |
| 2010/0154948 A1 | 6/2010 | Dahlberg |
| 2012/0175033 A1 | 7/2012 | Lavialle et al. |
| 2014/0041776 A1 | 2/2014 | Reinardt et al. |
| 2014/0041777 A1 | 2/2014 | Djelloul-Mazouz et al. |
| 2014/0069560 A1 | 3/2014 | Schweitzer et al. |
| 2014/0069561 A1* | 3/2014 | Dermience ......... B60C 11/1353 152/209.18 |
| 2014/0251519 A1 | 9/2014 | Piffard et al. |
| 2015/0119527 A1 | 4/2015 | Schäfer |
| 2016/0167440 A1 | 6/2016 | Schweitzer |
| 2018/0117972 A1* | 5/2018 | Perrin ................. B60C 11/0008 |

FOREIGN PATENT DOCUMENTS

| | | | |
|---|---|---|---|
| EP | 1990217 B1 | 12/2009 | |
| JP | H02246808 | 10/1990 | |
| JP | 2007223481 | 9/2007 | |
| WO | 2016174100 A1 | 11/2016 | |
| WO | WO 2016/174100 | * 11/2016 | ............... B60C 1/00 |
| WO | 2018100275 A1 | 6/2018 | |

* cited by examiner

PNEUMATIC TIRE HAVING A DUAL LAYER TREAD

BACKGROUND

A pneumatic tire typically includes a tread that contributes a substantial amount to the rolling resistance of the tire. Tread groove deformation may lead to subsequent heat buildup in the tread compound during operation of the tire and vice versa, thereby increasing rolling resistance. Further, groove deformation may have also a negative impact on the tire's performance. In particular, groove deformation may result in an unsatisfactory stiffness of the tire and in an unfavorable contact of the tire with the road.

U.S. Patent Application Publication 2010/0154948 A1 discloses a tire tread with groove reinforcement. In particular, the described tire has at least one circumferential groove separating circumferential ribs wherein each circumferential groove has two sides and a base there between. A reinforcing structure comprising a layer of a compound having reinforcing short fibers oriented between −20 degrees to +20 degrees to the circumferential direction of the tread is secured to the sides of each circumferential groove.

U.S. Pat. No. 6,213,181 B1 discloses a tire having a tread comprising circumferential grooves. The grooves have a groove wall lining for reducing formation of anomalies causing subjective user dissatisfaction. The lining extends over the full height of each groove and is made of a compound different from the compound of the remaining tread. In particular, the compound used for the groove lining is softer than the tread compound used in the remaining tread.

U.S. Pat. No. 8,104,523 discloses a pneumatic tire has a carcass structure having at least one carcass ply and at least one annual reinforcing structure associated with the carcass ply, a tread band made of an elastomeric material at a radially outer position with respect to the carcass structure, a belt structure interposed between the carcass structure and the tread band and a pair of axially opposite side walls on the carcass structure, wherein the tread band has i) at least one first sector, radially extending, substantially of a first elastomeric material; ii) a plurality of second sectors radially extending, positioned at axially opposite sides of the at least one first sector and substantially of a second elastomeric material; iii) at least one longitudinal groove formed in the at least one first sector and extending substantially for the entire circumferential development of the tread band.

U.S. Patent Publication 2014/0069561 discloses a tire tread comprising a plurality of circumferential grooves separating circumferential ribs, each groove comprising a bottom and two sidewalls, and a plurality of laterally separated reinforcements, wherein one reinforcement is arranged adjacent each circumferential groove, and wherein each reinforcement extends from the radially inner surface of the tread in a radial direction at least to the bottom of an adjacent circumferential groove to form the bottom of that groove.

U.S. Patent Publication 2014/0069560 discloses a rubber composition comprising at least one rubber component, between about 50 phr and about 120 phr of a filler, wherein at least 20 phr of the filler is a high surface area carbon black, and 10 phr and 30 phr of a phenolic resin; and a tire tread or a tire comprising such a composition.

U.S. Patent Publication 2016/0167440 discloses a tire comprising a tread comprising a plurality of circumferential grooves separating circumferential ribs, each groove comprising a bottom and two sidewalls; one or more groove reinforcements, each groove reinforcement laterally spaced from any other of said one or more groove reinforcements; wherein each groove reinforcement is arranged adjacent one circumferential groove; wherein at least one circumferential groove has no groove reinforcement adjacent to it; and wherein each groove reinforcement extends from the radially inner surface of the tread in a radially outward direction at least to the bottom of the adjacent circumferential groove to form at least part of the bottom of that groove.

SUMMARY

The present invention is directed to a pneumatic tire comprising a carcass and a tread located radially outward of the carcass and extending between the tire sidewalls; the tread providing a radially outermost tread running surface; the tread comprising a first tread layer comprising a first rubber compound and a second tread layer comprising a second rubber compound; wherein the second tread layer is located radially adjacent to the first tread layer; wherein the first rubber compound is compositionally distinct from the second rubber compound; wherein the second tread layer comprises one or more integrally formed extensions of the second tread layer extending radially outwardly toward the tread running surface; wherein each of the integrally formed extensions of the second tread layer comprises a circumferentially continuous groove and a reinforcement zone disposed on a side of the groove;

wherein the first rubber compound comprises 100 parts by weight of at least one diene based elastomer, and from 1 to 150 phr of silica; and the second rubber compound comprises a diene base elastomer, from 50 to 120 phr of a filler, wherein at least 20 phr of the filler is a high surface area carbon black having an iodine adsorption number of at least 100 g/kg, from 1 to 45 phr of a methylene acceptor, from 1 to 25 phr of a methylene donor, and from 1 to 30 phr of at least one additive selected from the group consisting of carbamic resins, liquid diene based polymers having a number average molecular weight ranging from 1000 to 25000, and aromatic hydrocarbon resins.

DESCRIPTION

There is disclosed a pneumatic tire comprising a carcass and a tread located radially outward of the carcass and extending between the tire sidewalls; the tread providing a radially outermost tread running surface; the tread comprising a first tread layer comprising a first rubber compound and a second tread layer comprising a second rubber compound; wherein the second tread layer is located radially adjacent to the first tread layer; wherein the first rubber compound is compositionally distinct from the second rubber compound; wherein the second tread layer comprises one or more integrally formed extensions of the second tread layer extending radially outwardly toward the tread running surface; wherein each of the integrally formed extensions of the second tread layer comprises a circumferentially continuous groove and a reinforcement zone disposed on a side of the groove;

wherein the first rubber compound comprises 100 parts by weight of at least one diene based elastomer, and from 1 to 150 phr of silica; and the second rubber compound comprises a diene base elastomer, from 50 to 120 phr of a filler, wherein at least 20 phr of the filler is a high surface area carbon black having an iodine adsorption number of at least 100 g/kg, from 1 to 45 phr of a methylene acceptor, from 1 to 25 phr of a methylene donor, and from 1 to 30 phr of at least one additive selected from the group consisting of carbamic resins, liquid diene based polymers having a number average molecular weight ranging from 1000 to 25000, and aromatic hydrocarbon resins.

FIGS. 1-6 illustrate various embodiments of the tire tread.

Figure 1:
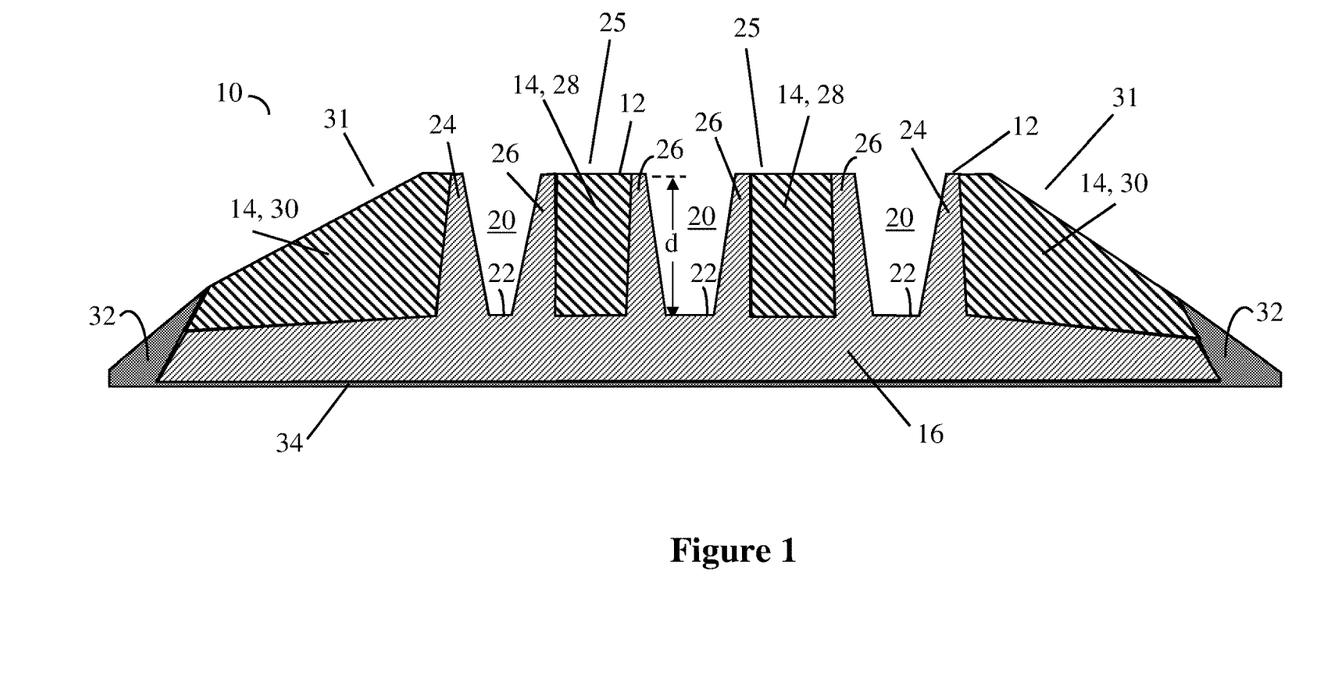
FIG. 1 shows a cross section of a tire tread according to one embodiment of the present invention.

FIG. 1 illustrates an embodiment of the tire tread with radial reinforcing extensions of the second tread layer fully extending to the running surface and the second tread layer extending axially substantially fully across the tread. With reference to FIG. 1, tire tread 10 shown in cross-section includes a two-layer ground-contacting tread including as a first tread layer outer tread 14 positioned radially outward of inner tread 16 as a second tread layer, with tread base 34 radially inward of inner tread 16. Tread base 34 optionally includes axially outermost wings 32.

Outer tread 14 includes shoulder zones 30 located in the shoulder areas 31 and rib zones 28 located in the ribs 25. Inner tread 16 includes one or more grooves 20 extending circumferentially and continuously around the tire. Each groove 20 has a depth d measured radially from ground-contacting running surface 12 to groove innermost surface 22. Each groove 20 is bounded on either side axially by two reinforcement zones, with reinforcement zones 24 adjacent shoulder zones 30 and reinforcement zones 26 adjacent rib zones 28. Together each groove 20 and two adjacent reinforcement zones comprise an integrally formed extension of the inner tread 16. By integrally formed, it is meant that the reinforcement zones 24, 26 are part of the whole of inner tread 16, made from a unitary, second rubber compound.

Each of ribs 25 include a rib zone 28 with two reinforcement zones 26 disposed on axially opposite sides of rib zone 28. Rib zone 28 extends radially inward from running surface 12 to a distance substantially equal to the distance d.

Outer tread 14 is made of a first rubber compound. In the embodiment shown in FIG. 1, rib zones 28 and shoulder zones 30 are made of the same first rubber compound. In other embodiments, rib zones 28 and shoulder zones 30 may be made of two or more different rubber compounds.

Figure 2:
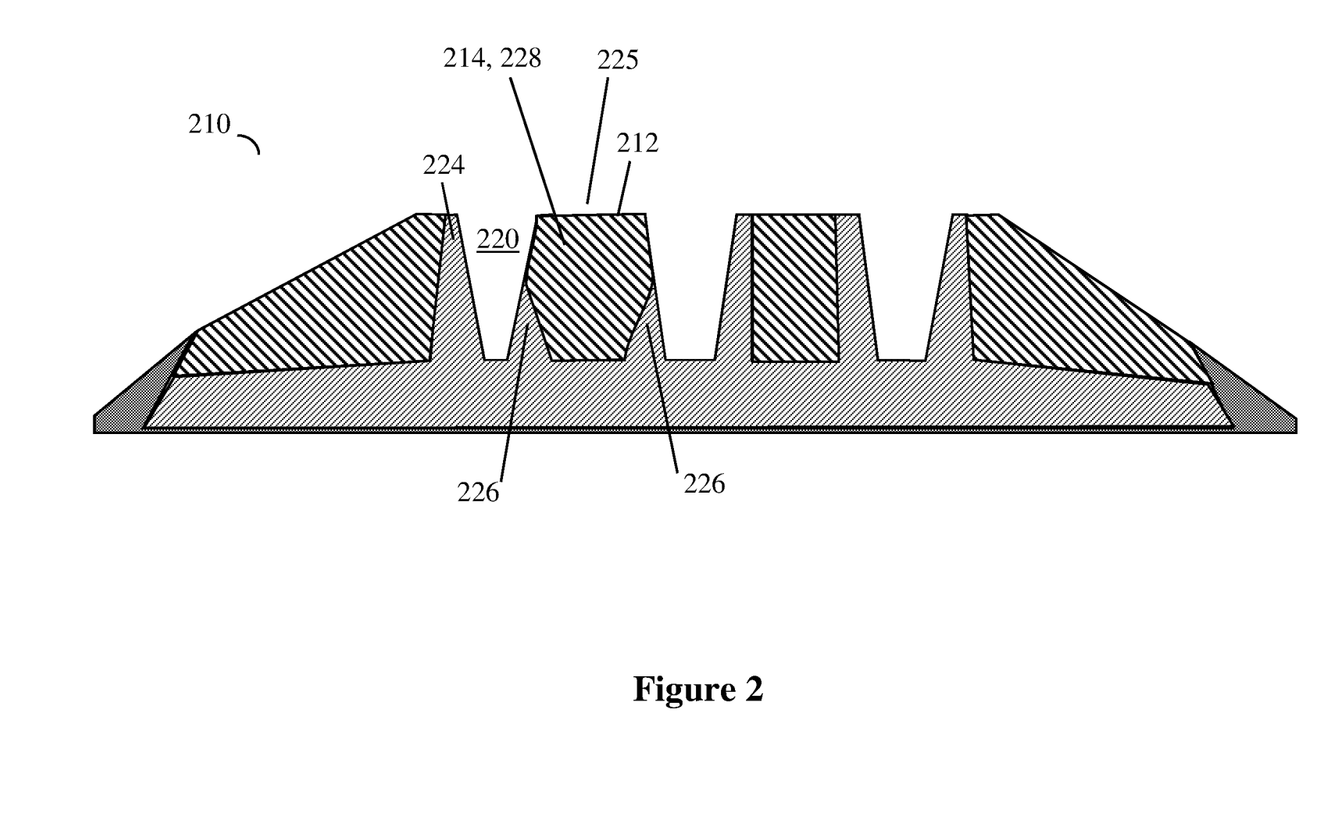
FIG. 2 shows a cross section of a tire tread according to another embodiment.

FIG. 2 illustrates an embodiment of the tire tread with some radial reinforcing extensions of the second tread layer fully extending to the running surface and some radial reinforcing extension of the second tread layer partially extending towards the running surface, and the second tread layer extending axially substantially fully across the tread. Other such embodiments are contemplated but not shown for brevity. With reference now to FIG. 2, an alternative embodiment of the tire tread 210 is shown wherein reinforcement zones 224 and 226 are disposed on opposite sides of groove 220, and two reinforcement zones 226 are disposed on axially opposite sides of rib zone 228 in rib 225. Reinforcement zones 226 extend partially from the second tread layer 216 radially outwardly towards the tread running surface 212. Reinforcement zone 224 extends fully to tread running surface 212.

Figure 3:
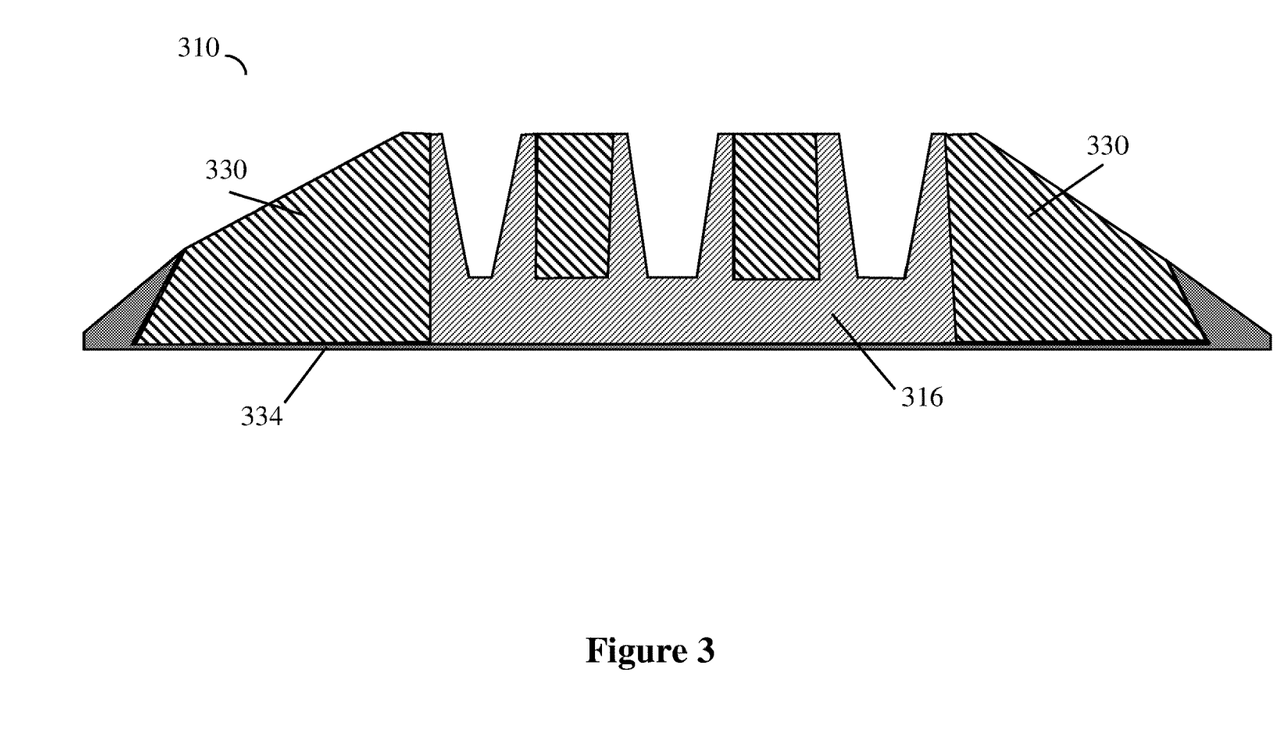
FIG. 3 shows a cross section of a tire tread according to another embodiment.

FIG. 3 illustrates an embodiment of the tire tread with radial reinforcing extensions of the second tread layer fully extending to the running surface and the second tread layer extending axially partially across the tread, with shoulder zones extending from the tread base. Other such embodiments are contemplated but not shown for brevity. FIG. 3 shows another embodiment of the tire tread 310. Tread 310 includes shoulder zones 330 disposing on axially opposite sides of second tread layer 316 and extending radially outward from tread base 334, in contrast to tread 10 of FIG. 1 wherein shoulder zones 30 extend radially outward from second tread layer 16.

Figure 4:
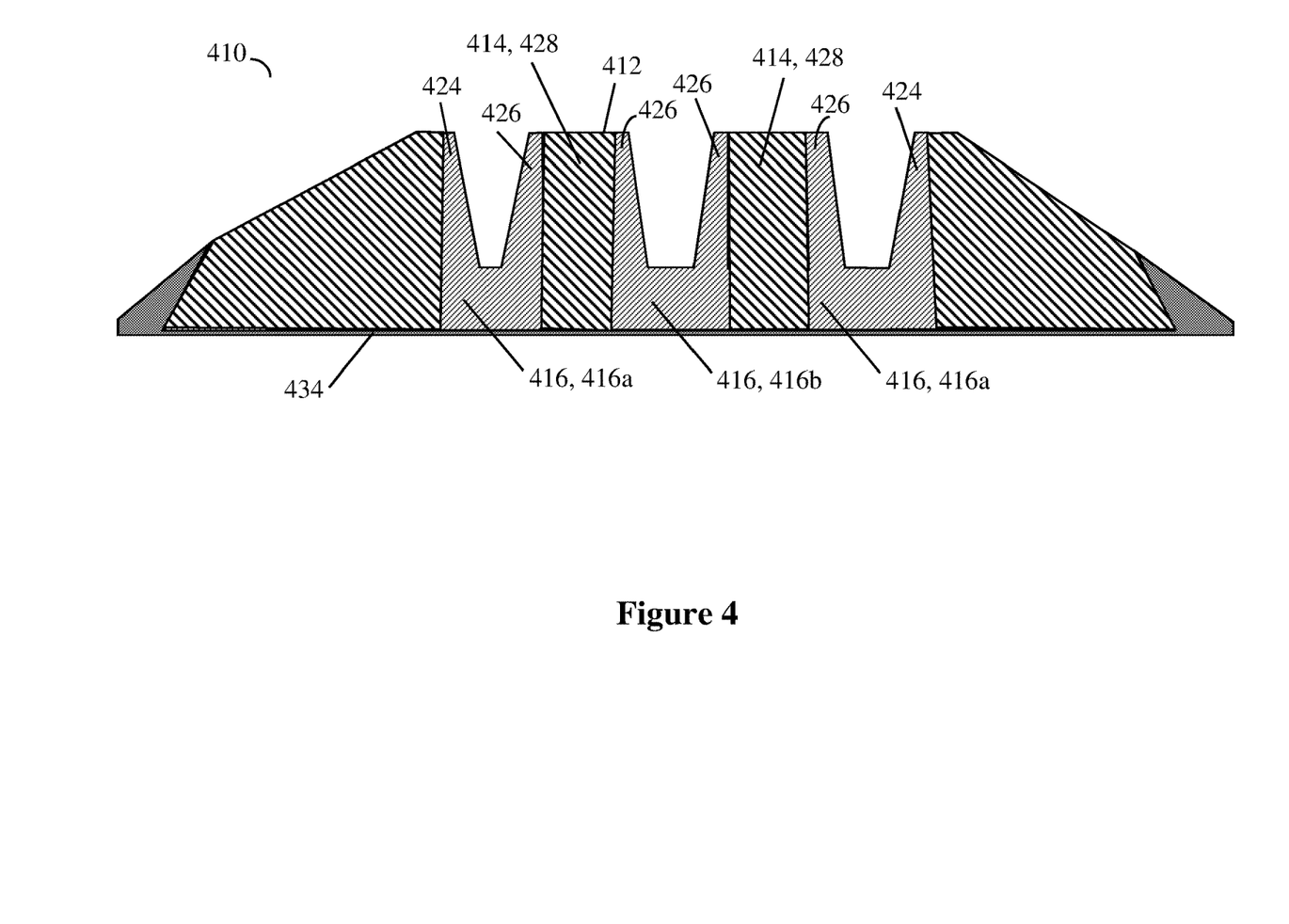
FIG. 4 shows a cross section of a tire tread according to another embodiment.

FIG. 4 illustrates an embodiment of the tire tread with radial reinforcing extensions of the second tread layer fully extending to the running surface and the second tread layer extending axially partially across the tread and separated into axially distinct parts, with shoulder zones extending from the tread base. Other such embodiments are contemplated but not shown for brevity. FIG. 4 shows another embodiment of the tire tread 410, wherein second tread layer 416 is divided into axially distinct reinforcement parts 416a, 416b each extending radially outward from tread base 434 fully to running surface 412. Correspondingly rib zones 428 of first tread layer 414 also extend radially outward from tread base 434 to running surface 412.

Figure 5:
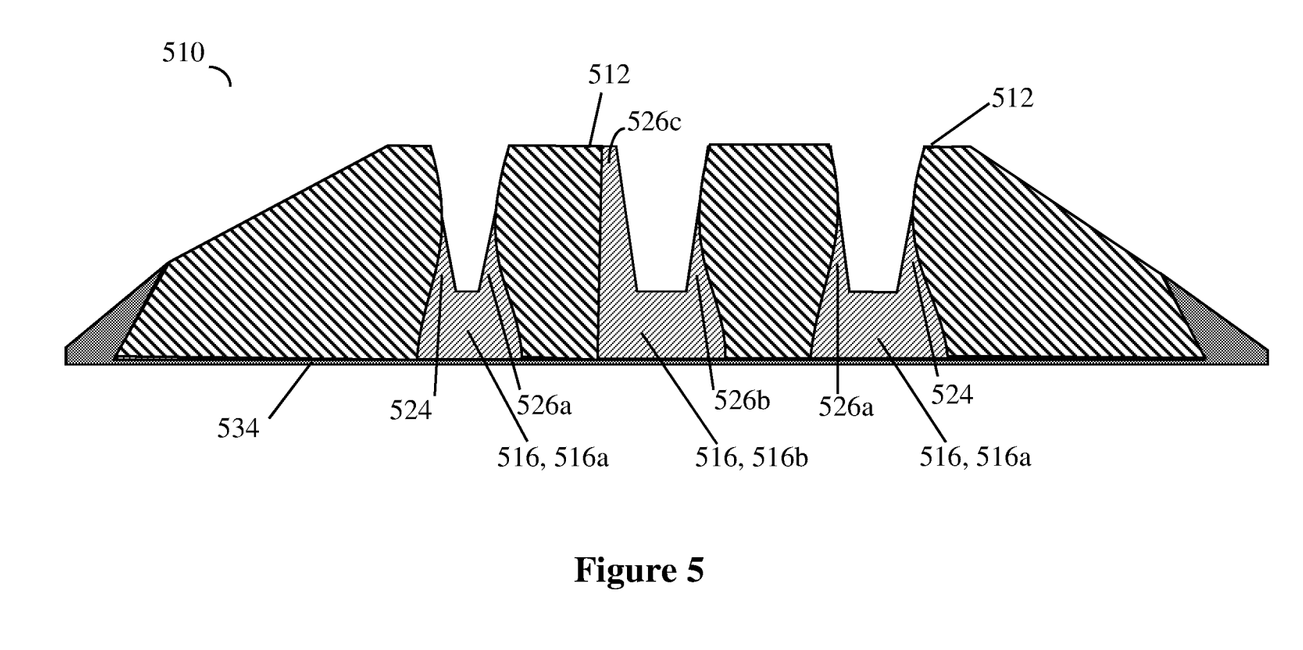
FIG. 5 shows a cross section of a tire tread according to another embodiment.

FIG. 5 illustrates an embodiment of the tire tread with some radial reinforcing extensions of the second tread layer fully extending to the running surface and some radial reinforcing extension of the second tread layer partially extending towards the running surface, and the second tread layer extending axially partially across the tread and separated into axially distinct parts, with shoulder zones extending from the tread base. Other such embodiments are contemplated but not shown for brevity. FIG. 5 shows another embodiment of the tire tread 510 wherein in contrast to tire tread 410, axially distinct reinforcement parts 516a include reinforcement zones 524, 526a extending partially from reinforcement part 516a radially outward toward tread running surface 512. Reinforcement part 516b includes partially extending reinforcement zone 526b and fully extending reinforcement zone 526c. In contrast, reinforcement zones 424, 426 of reinforcement parts 416a, 416b fully extend to the running surface 412.

Figure 6:
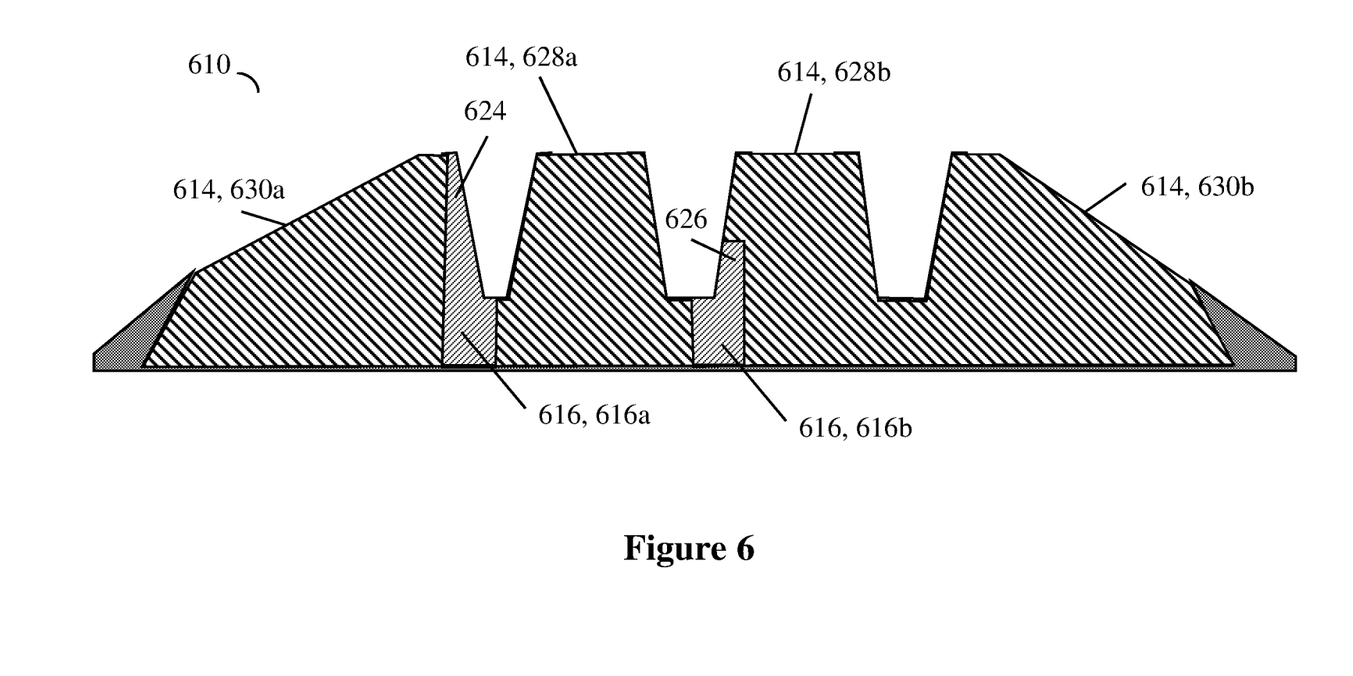
FIG. 6 shows a cross section of a tire tread according to another embodiment.

FIG. 6 illustrates an embodiment of the tire tread with some radial reinforcing extensions of the second tread layer fully extending to the running surface and some radial reinforcing extension of the second tread layer partially extending towards the running surface, and the second tread layer extending axially partially across the tread and separated into axially distinct parts and the distinct parts each disposed on a single side of a groove, with shoulder zones extending from the tread base. Other such embodiments are contemplated but not shown for brevity. FIG. 6 shows an embodiment of the tire tread 610 wherein second tread layer 616 has reinforcement parts 616a, 616b that include single reinforcement zones. Reinforcement part 616a includes fully radially extending reinforcement zone 624, and reinforcement part 616b includes partially radially extending reinforcement zone 626. In this embodiment, shoulder zone 630b is axially contiguous with rib zone 628b within first tread layer 614. Shoulder zone 630a and rib zone 628a are axially distinct in first tread layer 614.

The first rubber compound used in the rib zones and shoulder zones of the outer tread is a relatively soft compound designed to have good rolling resistance and wet grip properties. The second rubber compound used in the inner tread including the reinforcement zones is a relatively stiff compound designed to reinforce the ribs and grooves.

In one embodiment, the second rubber compound includes a diene base elastomer, from 50 to 120 phr of a filler, wherein at least 20 phr of the filler is a high surface area carbon black having an iodine adsorption number of at least 100 g/kg, from 1 to 45 phr of a methylene acceptor, from 1 to 25 phr of a methylene donor, and from 10 to 30 phr of at least one additive selected from the group consisting of carbamic resins, liquid diene based polymers having a number average molecular weight ranging from 1000 to 25000, and aromatic hydrocarbon resins.

The term "methylene acceptor" is known to those skilled in the art and is used to describe the reactant to which the methylene donor reacts to form what is believed to be a methylol monomer. The condensation of the methylol monomer by the formation of a methylene bridge produces the resin. The initial reaction that contributes the moiety that later forms into the methylene bridge is the methylene donor wherein the other reactant is the methylene acceptor. Representative compounds which may be used as a methylene acceptor include but are not limited to resorcinol, resorcinolic derivatives, monohydric phenols and their derivatives, dihydric phenols and their derivatives, polyhydric phenols and their derivatives, unmodified phenol novolak resins, modified phenol novolak resin, phenol formaldehyde resin, resorcinol novolak resins and mixtures thereof. Examples of methylene acceptors include but are not limited to those disclosed in U.S. Pat. Nos. 6,605,670; 6,541,551; 6,472,457; 5,945,500; 5,936,056; 5,688,871; 5,665,799; 5,504,127; 5,405,897; 5,244,725; 5,206,289; 5,194,513; 5,030,692; 4,889,481; 4,605,696; 4,436,853; and U.S. Pat. No. 4,092,455. Examples of modified phenol novolak resins include but are not limited to cashew nut oil modified phenol novolak resin, tall oil modified phenol novolak resin and alkyl modified phenol novolak resin. In one embodiment, the methylene acceptor is a reactive phenol-formaldehyde resin. Suitable reactive phenol-formaldehyde resins include SMD 30207 from Schenectedy Chemicals.

Other examples of methylene acceptors include activated phenols by ring substitution and a cashew nut oil modified novolak-type phenolic resin. Representative examples of activated phenols by ring substitution include resorcinol, cresols, t-butyl phenols, isopropyl phenols, ethyl phenols and mixtures thereof. Cashew nut oil modified novolak-type phenolic resins are commercially available from Schenectady Chemicals Inc. under the designation SP6700. The modification rate of oil based on total novolak-type phenolic resin may range from 10 to 50 percent. For production of the novolak-type phenolic resin modified with cashew nut oil, various processes may be used. For example, phenols such as phenol, cresol and resorcinol may be reacted with aldehydes such as formaldehyde, paraformaldehyde and benzaldehyde using acid catalysts. Examples of acid catalysts include oxalic acid, hydrochloric acid, sulfuric acid and p-toluenesulfonic acid. After the catalytic reaction, the resin is modified with the oil.

The amount of methylene acceptor in the second rubber compound may vary. In one embodiment, the amount of methylene acceptor ranges from 1 to 45 phr. In another embodiment, the amount of methylene acceptor ranges from 2 to 30 phr.

In-situ resins are formed in the second rubber compound and involve the reaction of a methylene acceptor and a methylene donor. The term "methylene donor" is intended to mean a compound capable of reacting with the methylene acceptor and generate the resin in-situ. Examples of methylene donors which are suitable for use in the present invention include hexamethylenetetramine, hexamethoxymethylmelamine, hexaethoxymethylmelamine, iminomethoxymethylmelamine, imino-isobutoxymethylmelamine, lauryloxymethylpyridinium chloride, ethoxymethylpyridinium chloride trioxan and hexamethoxymethylmelamine. In addition, the methylene donors may be N-substituted oxymethylmelamines, of the general formula:

wherein X is hydrogen or an alkyl having from 1 to 8 carbon atoms, $R_1'$ $R_2$, $R_3$, $R_4$ and $R_5$ are individually selected from the group consisting of hydrogen, an alkyl having from 1 to 8 carbon atoms, the group —$CH_2OX$ or their condensation products. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine and N,N'N"-tributyl-N,N',N"-trimethylolmelamine. The N-methylol derivatives of melamine are prepared by known methods.

The amount of methylene donor that may be present in the second rubber compound may vary. In one embodiment, the amount of methylene donor that is present will range from about 1 phr to 25 phr. In one embodiment, the amount of methylene donor ranges from about 2 phr to 20 phr.

The second rubber compound also includes from 10 to 30 phr of at least one additive selected from the group consisting of carbamic resins, liquid diene based polymers having a number average molecular weight ranging from 1000 to 25000, and aromatic hydrocarbon resins.

In one embodiment, the second rubber compound includes an aromatic hydrocarbon resin. Suitable aromatic hydrocarbon resins include styrene/α-methyl styrene resins, coumarone-indene resins, and the like.

In one embodiment, the aromatic hydrocarbon resin is copolymer resin of styrene and α-methyl styrene. Suitable styrene/α-methyl styrene resin is derived from styrene and alphamethylstyrene. It is considered that, in one aspect, its glass transition temperature (Tg) characteristic combined with its molecular weight (Mn) and molecular weight distribution (Mw/Mn) provides a suitable compatibility of the resin in the rubber composition, the degree of compatibility being directly related to the nature of the rubber composition.

The presence of the styrene/alphamethylstyrene resin in the second rubber compound is considered herein to be beneficial because of observed viscoelastic properties of the tread rubber composition such as complex and storage modulus, loss modulus tan delta and loss compliance at different temperature/frequency/strain as hereinafter generally described.

The properties of complex and storage modulus, loss modulus, tan delta and loss compliance are understood to be generally well known to those having skill in such art. They are hereinafter generally described.

The molecular weight distribution of the resin is visualized as a ratio of the resin's molecular weight average (Mw) to molecular weight number average (Mn) values and is considered herein to be in a range of about 1.5/1 to about 2.5/1 which is considered to be a relatively narrow range. This believed to be advantageous because of the selective compatibility with the polymer matrix and because of a contemplated use of the tire in wet and dry conditions over a wide temperature range.

The glass transition temperature Tg of the copolymer resin is considered herein to be in a range of about 20° C. to about 100° C., alternatively about 30° C. to about 80° C., depending somewhat upon an intended use of the prepared tire and the nature of the polymer blend for the tire tread. A suitable measurement of TG for resins is DSC according to ASTM D6604 or equivalent.

The styrene/alphamethylstyrene resin is considered herein to be a relatively short chain copolymer of styrene and alphamethylstyrene with a styrene/alphamethylstyrene molar ratio in a range of about 0.40 to about 1.50. In one aspect, such a resin can be suitably prepared, for example, by cationic copolymerization of styrene and alphamethylstyrene in a hydrocarbon solvent.

Thus, the contemplated styrene/alphamethylstyrene resin can be characterized, for example, by its chemical structure, namely, its styrene and alphamethylstyrene contents and softening point and also, if desired, by its glass transition temperature, molecular weight and molecular weight distribution.

In one embodiment, the styrene/alphamethylstyrene resin is composed of about 40 to about 70 percent units derived from styrene and, correspondingly, about 60 to about 30 percent units derived from alphamethylstyrene. In one embodiment, the styrene/alphamethylstyrene resin has a softening point according to ASTM No. E-28 in a range of about 80° C. to about 145° C.

In one embodiment, the amount of styrene/alphamethylestyrene resin in the second rubber compound ranges from 5 to 25 phr. In one embodiment, the amount of styrene/alphamethylestyrene resin in the second rubber compound ranges from 10 to 20 phr.

Suitable styrene/alphamethylstyrene resin is available commercially as Resin 2336 from Eastman or Sylvares SA85 from Arizona Chemical.

In one embodiment, the second rubber compound includes a carbamic resin derived from a monofunctional or multifunctional aldehyde A, and an organic compound C having at least one carbamate group —O—CO—$NH_2$, and an organic radical, where the radical can be a monovalent radical R selected from the group consisting of linear, branched or cyclic aliphatic radicals having from one to thirty carbon atoms, and aralkyl radicals, or a divalent organic radical —R'— selected from the group consisting of linear, branched or cyclic aliphatic diradicals having from two to thirty carbon atoms and bisalkyl aryl radicals having from 8 to 30 carbon atoms.

In one embodiment, R has from two to eight carbon atoms.

In one embodiment, an aliphatic carbamate is used as compound C which is selected from the group consisting of ethyl carbamate, butyl carbamate, hexyl carbamate and 2-ethylhexyl carbamate.

In one embodiment, an araliphatic carbamate is used as compound C which is selected from the group consisting of benzyl carbamate and α,α-dimethylbenzyl carbamate.

In one embodiment, a dicarbamate is used as compound C which is selected from the group consisting of ethylene biscarbamate, 1,2-propylene biscarbamate, 1,3-propylene bis carbamate, and 1,4-butylene biscarbamate.

In one embodiment, a dicarbamate is used as compound C which is selected from the group consisting of xylylene biscarbamate and tetramethylxylylene biscarbamate.

In one embodiment, a monofunctional aldehyde is used as aldehyde A, and which is selected from the group consisting of formaldehyde, acetaldehyde, propionaldehyde, butyraldehyde, n-pentanal, and n-hexanal.

In one embodiment, a multifunctional aldehyde is used as aldehyde A, and which is selected from the group consisting of glyoxal, malonaldehyde, succinaldehyde, and glutaraldehyde.

In one embodiment, the carbamic resin is derived from n-butylcarbamate and formaldehyde.

In one embodiment, the amount of carbamic resin, if any, in the second rubber compound ranges from 1 to 15 phr. In one embodiment, the amount of carbamic resin, if any, in the second rubber compound ranges from 2 to 10 phr.

Suitable carbamic resin is available commercially as Alnovol® UF410 and the like from Allnex.

In one embodiment, the second rubber composition includes a liquid polymer.

Suitable liquid polymer should have double bonds that can react with sulfur and the polymer matrix to form cross-links. These cross-links will prevent the migration of plasticizer to the surrounding compounds, and thus maintain the tensile properties and the durability of the reinforcing component.

Suitable liquid polymers are derived from conjugated diolefin (or diene) monomers. Such liquid polymers can also contain repeat units which are derived from other monomers which are copolymerizable with conjugated diolefin monomers. For instance, the liquid polymer can also contain repeat units which are derived from vinyl aromatic monomers, such as styrene. Polybutadiene rubber, polyisoprene rubber, styrene-butadiene rubber, isoprene-butadiene rubber, styrene-isoprene rubber and styrene-isoprene-butadiene rubber are some representative examples of polymers which can be used as the liquid polymer.

The liquid polymers are low molecular weight rubbery polymers of conjugated diolefin monomers. These low molecular weight rubbery polymers will also typically be comprised of repeat units which are derived from one or more conjugated diolefin monomers. Such low molecular weight rubbers can also, of course, contain repeat units which are derived from other monomers which are copolymerizable with conjugated diolefin monomers. For instance, the low molecular weight rubbery polymer can contain repeat units which are derived from vinyl aromatic monomers, such as styrene. Low molecular weight polybutadiene rubber, low molecular weight polyisoprene rubber, low molecular weight styrene-butadiene rubber, low molecular weight isoprene-butadiene rubber, low molecular weight styrene-isoprene rubber and low molecular weight styrene-isoprene-butadiene rubber are some representative examples of low molecular weight rubbery polymers which can be modified to make the wetting agents of this invention. The low molecular weight rubbery polymer will typically have a number average molecular weight which is within the range of about 1000 to about 25,000. The low molecular weight rubbery polymer will more typically have a number average molecular weight which is within the range of about 2000 to about 15,000.

The number average molecular weight may be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The detector used is preferably an ultraviolet detector. The fraction of chains existing as mono chains is determined as the ratio of the areas under the GPC curve, i.e., (mono chain peak area)/(total area).

Suitable liquid polymers are available commercially, for example as Ricon® from Cray Valley/Total.

The additive selected from the group consisting of carbamic resins, liquid diene based polymers having a number average molecular weight ranging from 1000 to 25000, and aromatic hydrocarbon resins is present in the second rubber compounds in an amount ranging from 1 to 30 phr. In one embodiment, the additive is present in the second rubber compound in an amount ranging from 10 to 20 phr.

The first and second rubber compounds independently include one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis 1,4 polybutadiene), polyisoprene (including cis 1,4 polyisoprene), butyl rubber, halobutyl rubber such as chlorobutyl rubber or bromobutyl rubber, styrene/isoprene/butadiene rubber, copolymers of 1,3 butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E SBR having a medium to relatively high bound styrene content, namely, a bound styrene content of about 30 to about 45 percent.

By emulsion polymerization prepared E-SBR, it is meant that styrene and 1,3 butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The first and second rubber compounds independently may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

The first and second rubber compounds independently may include silica, carbon black, or a combination of silica and carbon black.

The first and second rubber compounds independently may include from about 1 to about 150 phr of silica. In another embodiment, from 10 to 100 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the Journal of the American Chemical Society, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc. Silica pretreated or prereacted with organosilanes may also be used, such as Agilon® 400 and the like from PPG.

Commonly employed carbon blacks can be used as a conventional filler in combination with silica in an amount ranging from 1 to 150 phr. In another embodiment, from 10 to 100 phr of carbon black may be used. Although carbon black may be used with silica, in one embodiment, essentially no carbon black is used except for an amount required to impart black color to the tire which is from 1 to 10 phr. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm3/100 g.

In one embodiment, the second rubber compound includes up to 20 phr of a high surface area carbon black. Such high surface area carbon black may be characterized by its iodine absorption number, as measured by ASTM D-1510 or equivalent. In one embodiment, the high surface area carbon black has an iodine absorption number of at least 100 mg/g. In one embodiment, the high surface area carbon black has an iodine absorption number of at least 180 mg/g. Suitable high surface area carbon black is available as Vulcan CRX 1391 from Cabot.

Combinations of silica and carbon black may be used in the composition. In one embodiment, the weight ratio of silica to carbon black is greater than or equal to one.

Other fillers may be used in the first and second rubber compounds independently including, but not limited to, particulate fillers including ultra high molecular weight polyethylene (UHMWPE), crosslinked particulate polymer gels including but not limited to those disclosed in U.S. Pat. No. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the first and second rubber compounds independently may contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in first and second rubber compounds independently will vary depending on the level of other additives that are used. Generally speaking, the amount of the compound will range from 0.5 to 20 phr. In one embodiment, the amount will range from 1 to 10 phr.

It is readily understood by those having skill in the art that the first and second rubber compounds independently would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

In one embodiment, the first rubber compound comprises a combination of: less than 50 phr of filler and a viscoelastically immiscible blend of polymers consisting of a first rubber with a glass transition temperature above −25° C. and a second rubber with a glass transition temperature below −40° C. This second, low Tg rubber should form a continuous or co-continuous phase, with the first, higher Tg rubber forming a dispersed or co-continuous phase. A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute.

An example of the first rubber is 3,4-polyisoprene or styrene-butadiene rubber with a bound styrene content larger than 45% by weight. Suitable 3,4-polyisoprene is available as Isogrip, Tg=−10° C., from Karbochem. Suitable styrene-butadiene rubber may be produced via solution or emulsion polymerization, as is known in the art.

In one embodiment, the first rubber is an emulsion polymerized styrene butadiene rubber comprising more than 45 percent by weight of bound styrene, more than 98 percent of the repeat units derived from styrene in blocks containing less than five repeat units, and a Tg greater than −25° C.

The emulsion styrene-butadiene rubber (ESBR) is comprised of repeat units which are derived from 1,3-butadiene and styrene. These styrene-butadiene rubbers will contain at least 45 weight percent of units derived from styrene and less than 55 weight percent of units derived from 1,3-butadiene. By "units derived from" it is meant the monomer residues existing in the polymer after polymerization of the styrene and 1,3-butadiene monomers.

In the ESBR, the distribution of repeat units derived from styrene and butadiene is essentially random. The term "random" as used herein means that less than 5 percent of the total quantity of repeat units derived from styrene are in blocks containing five or more styrene repeat units. In other words, more than 95 percent of the repeat units derived from styrene are in blocks containing less than five repeat units. A large quantity of repeat units derived from styrene will be in blocks containing only one styrene repeat unit. Such blocks containing one styrene repeat unit are bound on both sides by repeat units which are derived from 1,3-butadiene.

In the ESBR, less than 2 percent of the total quantity of repeat units derived from styrene are in blocks containing five or more styrene repeat units. In other words, more than 98 percent of the repeat units derived from styrene are in blocks containing less than five repeat units. In one embodiment, less than 1 percent of the total quantity of repeat units derived from styrene are in blocks containing five or more styrene repeat units. In one embodiment, less than 0.5 percent of the total quantity of repeat units derived from styrene are in blocks containing five or more styrene repeat units.

Characterization of the styrene repeat units in the styrene-butadiene rubber (also referred to as "styrene block length" or "styrene sequence") may be done using ozonolysis following the procedures of Tanaka, et al., Rubber Chem. Technol. 1986, vol 59, p 16. as follows. The heterogeneity characterization of the styrene-butadiene polymer is achieved using chemical degradation. This is realized by ozonolysis of the dried polymer, followed by GC (gas chromatography) and GPC (gel permeation chromatography) analysis. In this procedure, a 0.5 grain sample of the rubber is dissolved in toluene and cooled to 10° C. and subjected to atmosphere of ozone generated from an ozonizer apparatus. The resulting solution is collected and subjected to GC column chromatography where each peak is isolated and characterized by GPC. The molecular weight of each peak is utilized to determine the number of styrene repeat units.

Suitable styrene-butadiene rubber as the first rubber may be produced, for example, in a continuous process in a multiple CSTR following the procedures disclosed in U.S. Pat. No. 6,458,884.

The ESBR as the first rubber has a glass transition temperature greater than −25° C. A reference to glass transition temperature, or Tg, of an elastomer or elastomer composition, where referred to herein, represents the glass transition temperature(s) of the respective elastomer or elastomer composition in its uncured state or possibly cured state in a case of an elastomer composition. A Tg can be suitably determined as a peak midpoint by a differential scanning calorimeter (DSC) at a temperature rate of increase of 10° C. per minute, for example according to ASTM D7426 or equivalent.

An example of the second rubber is natural rubber, high cis synthetic polyisoprene, or high-cis polybutadiene. In one embodiment, the second rubber is a polybutadiene having a cis 1,4 content greater than 95 percent and a Tg ranging from −80 to −110° C. Suitable polybutadiene rubbers may be prepared, for example, by organic solution polymerization of 1,3-butadiene. The BR may be conveniently characterized, for example, by having at least a 90 percent cis 1,4-content and a glass transition temperature Tg in a range of from about −95° C. to about −105° C. Suitable polybutadiene rubbers are available commercially, such as Budene® 1229 from Goodyear and the like, having a Tg of −108° C. and cis 1,4, content of 96%.

In this embodiment, the first rubber compound optionally includes a tackifier resin, such as alkylphenol formaldehyde resin or alkylphenol acetylene resin.

In such an embodiment for the first rubber compound, the use of suitable first rubber and suitable second rubber of the specified composition may result in a rubber composition having at least two polymer phases.

In this manner, it is considered herein that the relatively low Tg second rubber is relatively incompatible with, or immiscible with, the relatively high Tg first rubber as evidenced by their individual Tan delta peaks on a graphical presentation, or plot, of Tan delta versus temperature cured of the rubber composition within a temperature range encompassing the entire transition temperature range for both polymers, which may typically be from about −110° C. to about +150° C. The term "transition temperature" is meant to include both glass transition temperature Tg and melting temperature Tm, in the case of crystalline or partially crystalline materials.

Accordingly, the polymers of the rubber composition may be present in at least two phases, comprised of a first rubber phase and a second rubber phase.

In particular, a graphical plot of Tan delta versus temperature curve within a broad range of −110° C. to 150° C. for the first rubber composition of this embodiment may yield two peaks in the curve with one peak having its apex within a relatively low temperature range corresponding to the second rubber and a second peak with its apex within a higher temperature range corresponding to the first rubber.

Thus, one indication of the polymer incompatibilities is the presence of the dual Tan delta peaks for the cured elastomer composition. The Tan delta values, with the included peaks in their curves, can be determined by dynamic mechanical testing of the cured compound by procedures well known to those skilled in such art.

Alternatively, immiscibility of first rubber with the second rubber may be seen visually, as with atomic force microscopy and the like. Micrographs of the rubber composition may show visibly distinct polymer phases of first rubber and second rubber, appearing generally as dispersed phase regions of the first rubber in a continuous phase of the second rubber.

The mixing of the first and second rubber compounds independently can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLES

In the following Examples 1-5, the combination of various resins in rubber compositions usable as the second rubber compound is illustrated. A series of rubber compounds were mixed in a multi-step mixing procedure following the recipes given in Tables 1, 3, 5, 7, 9 and 11. The compounds were test for various physical properties, with results given in Tables 2, 4, 6, 8, 10, and 12. As seen in Tables, the use of resins as claimed shows favorable properties as indicated by 300% modulus, elongation, tensile strength, and hardness.

Example 1

TABLE 1

| Sample No. | 1 | 2 | 3 | 4 |
|---|---|---|---|---|
| polybutadiene | 10 | 10 | 10 | 10 |
| styrene-butadiene copolymer (oil extended) | 97.5 | 97.5 | 97.5 | 97.5 |
| carbon black[1] | 50 | 50 | 50 | 50 |
| silica | 20 | 20 | 20 | 20 |
| silane | 2 | 2 | 2 | 2 |
| phenol-formaldehyde resin[2] | 20 | 20 | 20 | 20 |
| hexamethylene tetramine | 3 | 3 | 3 | 3 |
| styrene-alpha methyl styrene resin[3] | 8 | 12 | 16 | 8 |
| carbamic resin[4] | 0 | 0 | 0 | 4 |
| wax | 1.5 | 1.5 | 1.5 | 1.5 |
| antioxidants | 3 | 3 | 3 | 3 |
| stearic acid | 3 | 3 | 3 | 3 |
| processing aid | 2 | 2 | 2 | 2 |
| zinc oxide | 2.5 | 2.5 | 2.5 | 2.5 |
| sulfur | 1.6 | 1.6 | 1.6 | 1.6 |
| N-tertbutyl-2benzothiazolesulfenamide | 1.63 | 1.63 | 1.63 | 1.63 |
| N-Cyclohexylthiophthalimide | 0.3 | 0.3 | 0.3 | 0.3 |

[1]Vulcan ® CRX 1391 from Cabot, Iodine number 202 mg/g
[2]SMD 30207 from Schenectedy Chemicals
[3]Resin 2336 from Eastman
[4]Alnovol ® UF410, from Allnex

TABLE 2

| Sample No. | 1 | 2 | 3 | 4 |
|---|---|---|---|---|
| 300% Modulus (MPa) | 11.5 | 10.6 | 10.5 | 10.9 |
| Elongation at break (%) | 329 | 359 | 390 | 426 |
| Tensile strength (MPa) | 11.8 | 11.6 | 12.8 | 14.1 |
| Shore A | 83.3 | 81.8 | 83 | 85.6 |
| Minimum viscosity (Mooney units) | 53.5 | 50.9 | 46.9 | 49.2 |
| Torque at 4 minutes (Mooney units) | 53.6 | 51 | 47.1 | 49.3 |

Example 2

TABLE 3

| Sample No. | 5 | 6 | 7 | 8 | 9 |
|---|---|---|---|---|---|
| Polybutadiene | 20 | 20 | 20 | 20 | 20 |
| Natural Rubber | 80 | 80 | 80 | 80 | 80 |
| Carbon Black | 50 | 50 | 50 | 50 | 50 |
| Waxes | 1.5 | 1.5 | 1.5 | 1.5 | 1.5 |
| Antidegradant | 2.5 | 2.5 | 2.5 | 2.5 | 2.5 |
| Ricon 184[5] | 0 | 15 | 0 | 35 | 0 |
| Ricon 100[6] | 0 | 0 | 15 | 0 | 35 |
| Oil | 15 | 0 | 0 | 0 | 0 |
| Stearic Acid | 3 | 3 | 3 | 3 | 3 |
| Silica | 20 | 20 | 20 | 20 | 20 |
| silane disulfide | 2 | 2 | 2 | 2 | 2 |
| phenol formaldehyde resin | 20 | 20 | 20 | 20 | 20 |
| fatty acid soap | 2 | 2 | 2 | 2 | 2 |
| hexamethylenetetramine | 3 | 3 | 3 | 3 | 3 |
| Antidegradant | 0.5 | 0.5 | 0.5 | 0.5 | 0.5 |
| Sulfenamide Accelerator | 2.36 | 2.36 | 2.36 | 2.36 | 2.36 |
| zinc oxide | 2.5 | 2.5 | 2.5 | 2.5 | 2.5 |
| sulfur | 1.6 | 1.6 | 1.6 | 1.6 | 1.6 |
| vulcanization inhibitor | 0.3 | 0.3 | 0.3 | 0.3 | 0.3 |

[5]liquid styrene-butadiene, Mn = 8600
[6]liquid styrene-butadiene, Mn = 4000

TABLE 4

| | | Sample No. | | | | |
|---|---|---|---|---|---|---|
| | | 5 | 6 | 7 | 8 | 9 |
| 300% Modulus | MPa | 10.1 | 10.1 | 10.1 | 7.9 | 7.1 |
| Elongation at Break | % | 508 | 518 | 508 | 481 | 502 |
| Tensile Strength | MPa | 17.6 | 17.8 | 17.7 | 12.7 | 12 |
| Shore A Hardness | | 86 | 85.4 | 86.6 | 89.3 | 90.6 |
| Minimum Viscosity | Mooney Units | 37.1 | 40 | 41.2 | 39.3 | 41.7 |
| Torque at 4 min | Mooney Units | 37.3 | 40.2 | 41.4 | 40.6 | 41.9 |

Example 3

TABLE 5

| Sample No. | 10 | 11 | 12 | 13 |
|---|---|---|---|---|
| Polybutadiene | 20 | 20 | 20 | 20 |
| Natural Rubber | 80 | 80 | 80 | 80 |
| Carbon Black | 50 | 50 | 50 | 50 |
| alkyl phenol-formaldehyde resin[7] | 0 | 0 | 0 | 20 |
| Exxon PR-383[8] | 20 | 0 | 0 | 0 |
| Exxon PR-395[9] | 0 | 20 | 0 | 0 |
| Coumarone-Indene resin[10] | 0 | 0 | 20 | 0 |
| Styrene-alpha methyl styrene resin | 0 | 0 | 0 | 10 |
| Carbamic Resin | 3 | 3 | 3 | 3 |
| Waxes | 1.5 | 1.5 | 1.5 | 1.5 |
| Antidegradant | 2.5 | 2.5 | 2.5 | 2.5 |
| Ricon ® 184 | 10 | 10 | 10 | |
| Stearic Acid | 3 | 3 | 3 | 3 |
| Solvay Premium SW silica | 30 | 30 | 30 | 30 |
| silane disulfide | 3.9 | 3.9 | 3.9 | 3.9 |
| Phenol formaldehyde Resin | 20 | 20 | 20 | 20 |
| Fatty acid salts | 2 | 2 | 2 | 2 |
| Hexamethylenetetramine | 3 | 3 | 3 | 3 |
| Antidegradant | 0.5 | 0.5 | 0.5 | 0.5 |
| Sulfenamide Accelerator | 2.36 | 2.36 | 2.36 | 2.36 |
| zinc oxide | 2.5 | 2.5 | 2.5 | 2.5 |
| sulfur | 1.6 | 1.6 | 1.6 | 1.6 |
| vulcanization inhibitor | 0.3 | 0.3 | 0.3 | 0.3 |

[7]octylphenol formaldehyde resin, as SP-1068 from SI Group
[8]aromatic hydrocarbon resin, Oppera ® PR 383 from Exxon
[9]aromatic hydrocarbon resin, Oppera Pr ® 395 from Exxon
[10]Cumar ® R-13 from Neville

TABLE 6

| Sample No. | | 10 | 11 | 12 | 13 |
|---|---|---|---|---|---|
| 300% Modulus | MPa | 7 | 6.9 | 5.6 | 7.1 |
| Elongation at Break | % | 513 | 521 | 520 | 441 |
| Tensile Strength | MPa | 11.8 | 12 | 9.4 | 9.9 |
| Shore A Hardness | | 88 | 86.6 | 93.2 | 93.6 |
| Minimum Viscosity | Mooney Units | 37 | 37.3 | 40.1 | 34.8 |
| Torque AT 4 min | Mooney Units | 37 | 37.4 | 40.1 | 34.9 |

Example 3

TABLE 7

| Sample No. | 14 | 15 |
|---|---|---|
| Polybutadiene | 20 | 20 |
| Natural Rubber | 80 | 80 |
| Carbon Black | 40 | 40 |
| Alkyl Phenol-Formaldehyde Resin | 20 | 20 |
| Waxes | 1.5 | 1.5 |
| Antidegradant | 2.5 | 2.5 |
| Stearic Acid | 3 | 3 |
| Solvay Premium SW silica | 30 | 30 |
| silane disulfide | 3.9 | 3.9 |
| Phenol Formaldehyde Resin | 20 | 20 |
| Fatty Acid Salts | 2 | 2 |
| Hexamethylenetetramin | 3 | 6 |
| Antidegradant | 0.5 | 0.5 |
| Sulfenamide Accelerator | 2.36 | 2.36 |
| Zinc oxide | 2.5 | 2.5 |
| Sulfur | 1.6 | 1.6 |
| Vulcanization Inhibitor | 0.3 | 0.3 |

TABLE 8

| Sample No. | | 14 | 15 |
|---|---|---|---|
| 300% Modulus | MPa | 9.5 | 10.3 |
| Elongation at Break | % | 510 | 499 |
| Tensile Strength | MPa | 15.7 | 16.2 |
| Minimum Viscosity | Mooney Units | 38.3 | 39.5 |
| Torque AT 4 min | Mooney Units | 38.5 | 39.5 |
| Shore A Hardness | | 90.5 | 91.9 |

Example 4

TABLE 9

| Sample No. | 16 | 17 |
|---|---|---|
| Polybutadiene | 20 | 20 |
| Natural Rubber | 80 | 80 |
| Carbon Black | 50 | 50 |
| Alkyl Phenol Formaldehyde Resin | 30 | 0 |
| Alkyl Phenol Acetylene Resin[11] | 0 | 30 |
| Carbamic Resin | 3 | 3 |
| Waxes | 1.5 | 1.5 |
| Antidegradant | 2.5 | 2.5 |
| Stearic Acid | 3 | 3 |
| Solvay Premium SW silica | 30 | 30 |
| silane disulfide | 3.9 | 3.9 |
| Phenol Formaldehyde Resin | 20 | 20 |
| Fatty acid soaps | 2 | 2 |

TABLE 9-continued

| Sample No. | 16 | 17 |
|---|---|---|
| Hexamethylenetetramine | 3 | 3 |
| Antidegradant | 0.5 | 0.5 |
| Sulfenamide Accelerator | 2.36 | 2.36 |
| Zinc oxide | 2.5 | 2.5 |
| sulfur | 1.6 | 1.6 |
| Vulcanization inhibitor | 0.3 | 0.3 |

[11]SMD 31144 from SI Group

TABLE 10

| Sample No. | | 16 | 17 |
|---|---|---|---|
| 300% Modulus | MPa | 8 | 7.7 |
| Elongation at Break | % | 460 | 454 |
| Tensile Strength | MPa | 11.7 | 11.1 |
| Shore A Hardness | | 95.2 | 94.3 |
| Minimum Viscosity | Mooney Units | 30.7 | 36.3 |
| Torque at 4 min | Mooney Units | 30.8 | 36.3 |

Example 5

TABLE 11

| Sample No. | 18 |
|---|---|
| Polybutadiene | 20 |
| Natural Rubber | 80 |
| Carbon Black | 50 |
| Alkyl Phenol Formaldehyde Resin | 20 |
| Carbamic Resin | 3 |
| Waxes | 1.5 |
| Antidegradant | 2.5 |
| Ricon 184 | 10 |
| Stearic Acid | 3 |
| Solvay Premium SW | 30 |
| silane disulfide | 3.9 |
| Phenol Formaldehyde Resin | 20 |
| Fatty acid salts | 2 |
| Hexamethylenetetramine | 3 |
| Antidegradant | 0.5 |
| Sulfenamide Accelerator | 2.36 |
| Zinc Oxide | 2.5 |
| sulfur | 1.6 |
| Vulcanization Inhibitor | 0.3 |

TABLE 12

| Sample No. | | 18 |
|---|---|---|
| 300% Modulus | MPa | 6.5 |
| Elongation at Break | % | 507 |
| Tensile Strength | MPa | 10.8 |
| Shore A | | 94.2 |
| Minimum Viscosity | Mooney Units | 31.3 |
| Torque at 4 min | Mooney Units | 31.4 |

Example 6

In this example, tires T2 and T3 having treads constructed with first and second tread layers are compared with a control tire T1 having a tread with monocap construction. All tires included an identical first rubber compound. Tires T2 were constructed using a tread design as shown in FIG. 1. Comparative tire T2 included a second rubber compound as reinforcing second layer following the teachings of U.S. Pat. No. 8,919,404. Inventive tire T3 included a second rubber compound as given in Example 5. Results of tire testing are given in Table 13. As seen in Table 13, tire T3 shows superior cornering stiffness compared to control tire T1 and comparative tire T2.

TABLE 13

| | Type | | |
|---|---|---|---|
| | Control | Comparative | Inventive |
| | Tire No. | | |
| | T1 | T2 | T3 |
| | Reinforcing Compound | | |
| Units | U.S. Pat. No. | | |
| | None | 8,919,404 | Example 5 |
| Trial 2 | | | |
| Cornering Stiffness Coefficient/deg | | | |
| @ 1448N | 0.426 | 0.507 | 0.528 |
| @ 2172N | 0.424 | 0.524 | 0.550 |
| @ 3138N | 0.410 | 0.509 | 0.538 |
| @ 4827N | 0.359 | 0.427 | 0.452 |
| @ 6420N | 0.297 | 0.340 | 0.359 |
| @ 8013N | 0.236 | 0.258 | 0.270 |
| Trial 3 | | | |
| Cornering Stiffness Coefficient/deg | | | |
| @ 1448N | 0.365 | 0.453 | 0.469 |
| @ 2172N | 0.357 | 0.459 | 0.478 |
| @ 3138N | 0.352 | 0.467 | 0.489 |
| @ 4827N | 0.336 | 0.438 | 0.459 |
| @ 6420N | 0.308 | 0.386 | 0.402 |
| @ 8013N | 0.272 | 0.330 | 0.342 |
| Trial 1 | | | |
| Cornering Stiffness Coefficient/deg | | | |
| @ 1577N | 0.385 | 0.475 | 0.496 |
| @ 2366N | 0.383 | 0.490 | 0.515 |
| @ 3418N | 0.375 | 0.483 | 0.510 |
| @ 5258N | 0.337 | 0.417 | 0.438 |
| @ 6993N | 0.288 | 0.340 | 0.357 |
| @ 8728N | 0.235 | 0.264 | 0.276 |

Example 7

In this example, the combination of first and second rubbers usable in the first rubber composition is illustrated.

TABLE 14

| | Sample No. | | | | | |
|---|---|---|---|---|---|---|
| | 19 | 20 | 21 | 22 | 23 | 24 |
| SSBR[1] | 0 | 0 | 20 | 40 | 0 | 0 |
| 3,4-polyisoprene[2] | 20 | 40 | 0 | 0 | 0 | 0 |
| Natural Rubber | 80 | 60 | 80 | 60 | 80 | 60 |
| ESBR[3] | 0 | 0 | 0 | 0 | 20 | 40 |
| Tackifier Resin[4] | 6 | 6 | 6 | 6 | 6 | 6 |
| Waxes | 2 | 2 | 2 | 2 | 1.5 | 1.5 |
| Fatty acid soap | 2 | 2 | 2 | 2 | 2 | 2 |
| Zinc oxide | 3 | 3 | 3 | 3 | 3 | 3 |
| Fatty acid | 3 | 3 | 3 | 3 | 3 | 3 |
| Silica, silane pretreated[5] | 40 | 40 | 40 | 40 | 0 | 0 |
| Silica[6] | 0 | 0 | 0 | 0 | 30 | 30 |
| Silane[7] | 0 | 0 | 0 | 0 | 3 | 3 |
| Silane[8] | 0 | 0 | 0 | 0 | 2 | 2 |
| Antidegradant, amines and quinolines | 4 | 4 | 4 | 4 | 3.5 | 3.5 |
| Sulfur | 1.4 | 1.4 | 1.4 | 1.4 | 1.2 | 1.2 |
| Sulfenamide | 2.2 | 2.2 | 2.2 | 2.2 | 3 | 3 |

TABLE 14-continued

| | Sample No. | | | | | |
|---|---|---|---|---|---|---|
| | 19 | 20 | 21 | 22 | 23 | 24 |
| Vulcuren ®[9] | 0.25 | 0.25 | 0.25 | 0.25 | 0.25 | 0.25 |
| diphenylguanidine | 0 | 0 | 0 | 0 | 1.5 | 1.5 |

[1]Solution polymerized SBR, 21% styrene, 62% vinyl 1,2, Tg −25 C., as Sprintan ® 4602 from Trinseo
[2]Isogrip ® from Karbochem
[3]ESBR, 50.8% (by weight) styrene, 8.2% vinyl 1,2; 4.2% cis 1,4; 36.8% trans 1,4; Tg (inflection) = −13° C.; 1% styrene sequences ≥5; from Goodyear Tire & Rubber Co.
[4]unreactive alkylphenol/formaldehyde resin, as SP 1068 from SI Group
[5]Agilon ® 400, from PPG
[6]Zeosil Premium ® 200MP, from Solvay
[7]Bis(triethoxysilylpropyl)disulfide
[8]Bis(triethoxysilylpropyl)tetrasulfide, 50% on carbon black
[9]1,6-bis(N,N'-dibenzylthiocarbamoyldithio) hexane, as Vulcuren ® from Lanxess

TABLE 15

| | | Sample No. | | | | | |
|---|---|---|---|---|---|---|---|
| | | 19 | 20 | 21 | 22 | 23 | 24 |
| G' (1% strain) | MPa | 0.7 | 0.66 | 0.77 | 0.78 | 0.93 | 0.94 |
| Tan Delta (10% strain) | | 0.072 | 0.075 | 0.049 | 0.044 | 0.037 | 0.044 |
| G' (50% strain) | MPa | 0.49 | 0.47 | 0.56 | 0.59 | 0.73 | 0.74 |
| 300% Modulus | MPa | 4.8 | 4.5 | 5.3 | 5.4 | 9 | 8 |
| Elongation at Break | % | 660 | 673 | 647 | 624 | 512 | 497 |
| Tensile Strength | MPa | 18 | 15.8 | 19.5 | 17.2 | 19.3 | 15.9 |
| Shore A | | 52.2 | 51.7 | 52.5 | 52.9 | 58.2 | 59.9 |
| Rebound 100° C. | % | 75.9 | 72.7 | 78.9 | 78.1 | 79.7 | 76.6 |

What is claimed:

1. A pneumatic tire comprising a carcass and a tread located radially outward of the carcass and extending between the tire sidewalls; the tread providing a radially outermost tread running surface; the tread comprising a first tread layer comprising a first rubber compound and a second tread layer comprising a second rubber compound; wherein the second tread layer is located radially adjacent to the first tread layer; wherein the first rubber compound is compositionally distinct from the second rubber compound; wherein the second tread layer comprises one or more integrally formed extensions of the second tread layer extending radially outwardly toward the tread running surface; wherein each of the integrally formed extensions of the second tread layer comprises a circumferentially continuous groove and a reinforcement zone disposed on a side of the groove;
wherein the first rubber compound comprises less than 50 phr of filler, a first rubber with a glass transition temperature above −25° C., and a second rubber with a glass transition temperature below −40° C.; and
the second rubber compound comprises a diene base elastomer, from 50 to 120 phr of a filler, wherein at least 20 phr of the filler is a high surface area carbon black having an iodine adsorption number of at least 100 g/kg, from 1 to 45 phr of a methylene acceptor, from 1 to 25 phr of a methylene donor, and from 1 to 30 phr of at least one additive selected from the group consisting of carbamic resins, liquid diene based polymers having a number average molecular weight ranging from 1000 to 25000, and aromatic hydrocarbon resins.

2. The pneumatic tire of claim 1, wherein the reinforcement zone comprises first and second reinforcement zones disposed on axially opposite sides of the groove.

3. The pneumatic tire of claim 1, wherein at least one reinforcement zone extends radially from a radially innermost surface of the groove to the tread running surface.

4. The pneumatic tire of claim 1, wherein at least one reinforcement zone extends radially from a radially innermost surface of the groove and radially partially to the tread running surface.

5. The pneumatic tire of claim 1, wherein the methylene acceptor is selected from the group consisting of resorcinol, resorcinolic derivatives, monohydric phenols and their derivatives, dihydric phenols and their derivatives, polyhydric phenols and their derivatives, unmodified phenol novolak resins, modified phenol novolak resin, phenol formaldehyde resin, resorcinol novolak resins and mixtures thereof.

6. The pneumatic tire of claim 1, wherein the methylene acceptor is a phenol formaldehyde resin.

7. The pneumatic tire of claim 1, wherein the methylene donor is selected from the group consisting of hexamethylenetetramine, hexamethoxymethylmelamine, hexaethoxymethylmelamine, imino-methoxymethylmelamine, imino-isobutoxymethylmelamine, lauryloxymethylpyridinium chloride, ethoxymethylpyridinium chloride trioxan and hexamethoxymethylmelamine, and N-substituted oxymethylmelamines, of the general formula:

wherein X is hydrogen or an alkyl having from 1 to 8 carbon atoms, $R_1'$ $R_2$, $R_3$, $R_4$ and $R_5$ are individually selected from the group consisting of hydrogen, an alkyl having from 1 to 8 carbon atoms, the group —CH2OX or their condensation products.

8. The pneumatic tire of claim 1, wherein the amount of methylene acceptor ranges from 2 to 30 phr.

9. The pneumatic tire of claim 1, wherein the amount of methylene donor ranges from 2 to 20 phr.

10. The pneumatic tire of claim 1, wherein the second rubber compound comprises a copolymer resin of styrene and α-methyl styrene comprises from 40 to 70 weight percent units derived from styrene and, from 60 to 30 weight percent units derived from α-methylstyrene.

11. The pneumatic tire of claim 10, wherein the copolymer resin of styrene and α-methyl styrene has a softening point according to ASTM No. E-28 in a range of 80° C. to 145° C.

12. The pneumatic tire of claim 10, wherein the amount of copolymer resin of styrene and α-methyl styrene ranges from 5 to 25 phr.

13. The pneumatic tire of claim 1, wherein the second rubber composition further comprises a carbamic resin.

14. The pneumatic tire of claim 1, wherein the second rubber composition further comprises a carbamic resin derived from a monofunctional or multifunctional aldehyde A, and an organic compound C having at least one carbamate group —O—CO—NH$_2$, and an organic radical, where the radical can be a monovalent radical R selected from the group consisting of linear, branched or cyclic aliphatic radicals having from one to thirty carbon atoms, and aralkyl radicals, or a divalent organic radical —R'— selected from the group consisting of linear, branched or cyclic aliphatic diradicals having from two to thirty carbon atoms and bisalkyl aryl radicals having from 8 to 30 carbon atoms.

15. The pneumatic tire of claim 1, wherein the second rubber composition further comprises a carbamic resin derived from n-butylcarbamate and formaldehyde.

16. The pneumatic tire of claim 13, wherein the amount of carbamic resin ranges from 1 to 15 phr.

17. The pneumatic tire of claim 1, wherein the second rubber composition comprises a liquid diene based polymers having a number average molecular weight ranging from 1000 to 25000.

18. The pneumatic tire of claim 1, wherein the first rubber is 3,4-polyisoprene or styrene-butadiene rubber with a bound styrene content larger than 45% by weight, and the second rubber is selected from the group consisting of natural rubber, high cis synthetic polyisoprene, and high-cis polybutadiene having a cis 1,4 content greater than 95 percent and a Tg ranging from −80 to −110° C.

19. The pneumatic tire of claim 1, wherein the first rubber is an emulsion polymerized styrene butadiene rubber comprising more than 45 percent by weight of bound styrene, more than 98 percent of the repeat units derived from styrene in blocks containing less than five repeat units, and a Tg greater than −25° C.

* * * * *